US012769427B2

(12) United States Patent
Li et al.

(10) Patent No.: US 12,769,427 B2
(45) Date of Patent: Oct. 20, 2026

(54) ARRAY SUBSTRATE AND TOUCH DISPLAY DEVICE

(71) Applicants: FUZHOU BOE OPTOELECTRONICS TECHNOLOGY CO., LTD., Fujian (CN); BOE TECHNOLOGY GROUP CO., LTD., Beijing (CN); BEIJING BOE TECHNOLOGY DEVELOPMENT CO., LTD., Beijing (CN)

(72) Inventors: Chunyu Li, Beijing (CN); Bo Hu, Beijing (CN); Lifeng Lin, Beijing (CN); Xin Lin, Beijing (CN); Rong Zhou, Beijing (CN); Xiaofeng Yin, Beijing (CN); Jianshu Wang, Beijing (CN); Pei Hu, Beijing (CN); Tongwei Mo, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 17 days.

(21) Appl. No.: 18/995,235

(22) PCT Filed: Oct. 26, 2023

(86) PCT No.: PCT/CN2023/126923
§ 371 (c)(1),
(2) Date: Jan. 16, 2025

(87) PCT Pub. No.: WO2025/086221
PCT Pub. Date: May 1, 2025

(65) Prior Publication Data

US 2025/0244852 A1 Jul. 31, 2025

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC .... G06F 3/0446; G06F 3/0412; G06F 3/0443; G06F 3/041; G06F 3/044
See application file for complete search history.

(56) References Cited

U.S. PATENT DOCUMENTS

2016/0239120 A1* 8/2016 Jeong .................... G06F 3/0446
2018/0120986 A1 5/2018 Miyazaki et al.
(Continued)

FOREIGN PATENT DOCUMENTS

CN 102541335 A 7/2012
CN 104516145 A 4/2015
(Continued)

OTHER PUBLICATIONS

International Search Report and Written Opinion of PCT application No. PCT/CN2023/126923 dated Apr. 7, 2024.
(Continued)

*Primary Examiner* — Temesghen Ghebretinsae
*Assistant Examiner* — Sosina Abebe
(74) *Attorney, Agent, or Firm* — Calfee, Halter & Griswold LLP

(57) ABSTRACT

The present disclosure provides an array substrate and a touch display device. The array substrate includes: a plurality of pixels arranged in an array, each pixel includes N sub-pixels of different colors arranged along a first direction,
(Continued)

and N≥3; a plurality of touch sensor units arranged in an array, each touch sensor unit corresponds to m*N sub-pixels in the first direction, and m is a positive integer; a plurality of touch signal lines, each touch sensor unit is connected with at least one touch signal line. Along the first direction, each touch sensor unit in a same row is connected with a same number of touch signal lines, each touch signal line is connected with a corresponding touch sensor unit through an access point, and the access points of the touch signal lines connected to a same row of touch sensor units are in a same sub-pixel color environment.

11 Claims, 17 Drawing Sheets

(56) References Cited

U.S. PATENT DOCUMENTS

| | | | | |
|---|---|---|---|---|
| 2018/0284926 | A1 | 10/2018 | Kim et al. | |
| 2018/0341354 | A1* | 11/2018 | Guo | G06F 3/0443 |
| 2019/0227652 | A1* | 7/2019 | Kwon | G06F 3/041 |
| 2021/0026179 | A1* | 1/2021 | Qiao | G06F 3/04164 |
| 2022/0005836 | A1 | 1/2022 | Wang et al. | |

FOREIGN PATENT DOCUMENTS

| | | | | | |
|---|---|---|---|---|---|
| CN | 205644474 | U | | 10/2016 | |
| CN | 106681045 | A | | 5/2017 | |
| CN | 107193417 | A | | 9/2017 | |
| CN | 107255882 | A | | 10/2017 | |
| CN | 109445646 | A | * | 3/2019 | G06F 3/0412 |
| CN | 109643186 | A | | 4/2019 | |
| CN | 110297572 | A | | 10/2019 | |
| CN | 212515728 | U | | 2/2021 | |
| CN | 112711353 | A | | 4/2021 | |

OTHER PUBLICATIONS

International Search Report of application No. PCT/CN2023/126923 dated Apr. 7, 2024.

Written Opinion from PCT/CN2023/126923 dated Apr. 7, 2024 (English machine translation attached).

First Office Action of CN application No. 202380011418.X dated May 23, 2026.

* cited by examiner

ARRAY SUBSTRATE AND TOUCH DISPLAY DEVICE

RELATED APPLICATION

The present application is a 35 U.S.C. 371 national stage application of PCT International Application No. PCT/CN2023/126923, filed on Oct. 26, 2023, the entire disclosure of which is incorporated herein by reference.

TECHNICAL FIELD

The present disclosure relates to the field of the display technology, in particular to an array substrate and a touch display device comprising the array substrate.

BACKGROUND

In touch technology of display screen, in-cell touch is widely used, for example, it has been used on 86-inch ultra-high definition (UHD) touch display screen. The main feature of in-cell touch is that the touch signal line is integrated on the glass substrate of array thin film transistor (TFT) and connected with the touch sensor unit through the wiring in the pixel. In the related art, in the same row of touch sensor units, the sub-pixels where the access points of the touch signal lines connected to the touch sensor units are of different colors, resulting in vertical stripes being displayed, and the period of the vertical stripes is consistent with the period of the access points of the touch signal lines connected to the touch sensor units.

SUMMARY

According to an aspect of the disclosure, an array substrate is provided. The array substrate comprises: a plurality of pixels arranged in an array, wherein each pixel comprises N sub-pixels of different colors arranged along a first direction, and N≥3; a plurality of touch sensor units arranged in an array, wherein each touch sensor unit corresponds to m*N sub-pixels in the first direction, and m is a positive integer; a plurality of touch signal lines, wherein each touch sensor unit is connected with at least one touch signal line; wherein along the first direction, each touch sensor unit in a same row is connected with a same number of touch signal lines, each touch signal line is connected with a corresponding touch sensor unit through an access point, and the access points of the touch signal lines connected to a same row of touch sensor units are in a same sub-pixel color environment.

In some embodiments, the access points of the plurality of touch signal lines are in at least two colors of sub-pixels.

In some embodiments, the array substrate comprises at least one touch display area, and in each touch display area, access points of touch signal lines connected to the same row of touch sensor units are in a same color of sub-pixels.

In some embodiments, along a second direction, the access points of the touch signal lines connected to each column of touch sensor units sequentially rotate among N colors of sub-pixels, and the second direction intersects with the first direction.

In some embodiments, every two adjacent rows of touch sensor units form a touch sensor unit group, and the access points of the touch signal lines connected to each touch sensor unit group are in a same color of sub-pixels, and along a second direction, the access points of the touch signal lines connected to each touch sensor unit group sequentially rotate among N colors of sub-pixels, the second direction intersects with the first direction.

In some embodiments, every three adjacent rows of touch sensor units form a touch sensor unit group, and the access points of the touch signal lines connected to each touch sensor unit group are in a same color of sub-pixels, and along a second direction, the access points of the touch signal lines connected to each touch sensor unit group sequentially rotate among N colors of sub-pixels, the second direction intersects with the first direction.

In some embodiments, the array substrate comprises at least one touch display area, and in each touch display area, access points of touch signal lines connected to the same row of touch sensor units are between same adjacent two colors of sub-pixels.

In some embodiments, each pixel comprises a first color sub-pixel, a second color sub-pixel and a third color sub-pixel, access points of the touch signal lines connected to the touch sensor units in row 3a+1 are between a first color sub-pixel and a second color sub-pixel, access points of the touch signal lines connected to the touch sensor units in row 3a+2 are between a third color sub-pixel and a first color sub-pixel, and access points of the touch signal lines connected to the touch sensor units in row 3a+3 are between a second color sub-pixel and a third color sub-pixel, wherein a is 0 or a positive integer.

In some embodiments, the access points of the touch signal lines connected to the touch sensor units in row 3a+1 are between the first color sub-pixel and the second color sub-pixel comprises: for each touch sensor unit in row 3a+1, in a pixel in row 2b+1, the access point of the touch signal line is in the first color sub-pixel, and in a pixel in row 2b+2, the access point of the touch signal line is in the second color sub-pixel, wherein b is 0 or a positive integer; the access points of the touch signal lines connected to the touch sensor units in row 3a+2 are between the third color sub-pixel and the first color sub-pixel comprises: for each touch sensor unit in row 3a+2, in a pixel in row 2b+1, the access point of the touch signal line is in the third color sub-pixel, and in a pixel in row 2b+2, the access point of the touch signal line is in the first color sub-pixel, wherein b is 0 or a positive integer; and the access points of the touch signal lines connected to the touch sensor units in row 3a+3 are between the second color sub-pixel and the third color sub-pixel comprises: for each touch sensor unit in row 3a+3, in a pixel in row 2b+1, the access point of the touch signal line is in the second color sub-pixel, and in a pixel in row 2b+2, the access point of the touch signal line is in the third color sub-pixel, wherein b is 0 or a positive integer.

In some embodiments, the access points of the touch signal lines connected to the touch sensor units in row 3a+1 are between the first color sub-pixel and the second color sub-pixel comprises: for each touch sensor unit in row 3a+1, in each row of pixels, the access point of the touch signal line spans across the first color sub-pixel and the second color sub-pixel; the access points of the touch signal lines connected to the touch sensor units in row 3a+2 are between the third color sub-pixel and the first color sub-pixel comprises: for each touch sensor unit in row 3a+2, in each row of pixels, the access point of the touch signal line spans across the third color sub-pixel and the first color sub-pixel; and the access points of the touch signal lines connected to the touch sensor units in row 3a+3 are between the second color sub-pixel and the third color sub-pixel comprises: for each touch sensor unit in row 3a+3, in each row of pixels, the access point of the touch signal line spans across the second color sub-pixel and the third color sub-pixel.

In some embodiments, each pixel comprises a first color sub-pixel, a second color sub-pixel and a third color sub-pixel, each touch sensor unit is divided into a first part and a second part adjacent in a second direction, the access point of the touch signal line connected to a touch sensor unit in row 3 c+1 is in the first color sub-pixel in the first part of the touch sensor unit in row 3 c+1, the access point of the touch signal line connected to the touch sensor unit in row 3 c+1 is in the second color sub-pixel in the second part of the touch sensor unit in row 3 c+1, the access point of the touch signal line connected to a touch sensor unit in row 3 c+2 is in the third color sub-pixel in the first part of the touch sensor unit in row 3 c+2, the access point of the touch signal line connected to the touch sensor unit in row 3 c+2 is in the first color sub-pixel in the second part of the touch sensor unit in row 3 c+2, the access point of the touch signal line connected to a touch sensor unit in row 3 c+3 is in the second color sub-pixel in the first part of the touch sensor unit in row 3 c+3, and the access point of the touch signal line connected to the touch sensor unit in row 3 c+3 is in the third color sub-pixel in the second part of the touch sensor unit in row 3 c+3, wherein c is 0 or a positive integer.

In some embodiments, each pixel comprises a first color sub-pixel, a second color sub-pixel and a third color sub-pixel, and the array substrate comprises at least one touch display area, in each touch display area, every three adjacent rows of touch sensor units form a touch sensor unit group, and the access points of touch signal lines connected to each touch sensor unit group are in a same color of sub-pixels, and along a second direction, the access points of touch signal lines connected to each touch sensor unit group sequentially rotate in the first color sub-pixel and the third color sub-pixel.

In some embodiments, the first color sub-pixel comprises a red sub-pixel, the second color sub-pixel comprises a green sub-pixel and the third color sub-pixel comprises a blue sub-pixel.

In some embodiments, the array substrate comprises at least one touch display area and at least one control chipset, and each control chipset is configured to control touch sensor units in a corresponding touch display area.

In some embodiments, in each touch display area, each of at least one row of touch sensor units arranged at an end far from the control chipset is connected to two touch signal lines respectively, and each of at least one row of touch sensor units arranged at an end near the control chipset is connected to one touch signal line respectively, and the access points of the touch signal lines connected to a same row of touch sensor units are in a same sub-pixel color environment.

In some embodiments, in each touch display area, each touch signal line extends the entire touch display area in the second direction.

In some embodiments, the array substrate further comprises a plurality of dummy signal lines, each dummy signal line extending in a same layer and a same direction as the plurality of touch signal lines.

In some embodiments, each sub-pixel unit comprises a common electrode, and at the access point of each touch signal line, the touch signal line is connected with the common electrode of the corresponding sub-pixel unit through a via hole.

In some embodiments, the access points of the plurality of touch signal lines are in a same color of sub-pixels in a same row of pixels.

According to another aspect of the present disclosure, there is also provided a touch display device comprising the array substrate as described above.

BRIEF DESCRIPTION OF THE DRAWINGS

In order to more clearly illustrate the technical solutions in embodiments of the disclosure, the drawings needed to be used in the description of the embodiments will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

Figure 1:
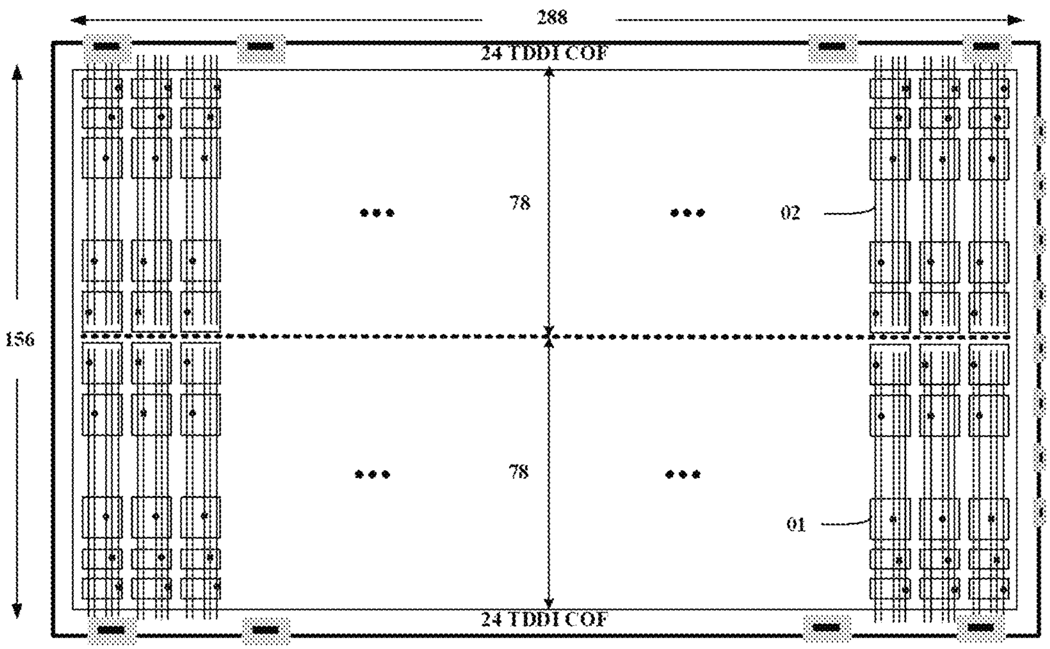
Related Art Fig. 1
FIG. 1 shows a schematic diagram of the division scheme of touch sensor units of a touch display screen in the related art.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

It can be understood that the drawings in the embodiment of the present disclosure are only used to schematically show the connection relationship between various components, and the dimensions of various components in the drawings are not drawn to scale, and their relative position relationship does not necessarily correspond to the actual position. In the drawings, the proportions of some regions and layers may be exaggerated for clarity.

In the related art, for an 86-inch embedded touch display screen with a resolution of 3840×2160, the current division scheme of touch sensor units is: the number of touch sensor units is 288 (H)×156 (V), that is, a main touch sensor unit comprises 40 sub-pixels×14 pixels (one pixel comprises 3 sub-pixels) and a sub-touch sensor unit comprises 40 sub-pixels×8 pixels. FIG. 1 shows a schematic diagram of the division scheme of the touch sensor units mentioned above, where reference number 01 indicates the touch sensor unit and reference number 02 indicates the touch signal line. Since 40 sub-pixels cannot be divisible by 3, that is, each touch sensor unit will contain a separate column of red sub-pixels or green sub-pixels or blue sub-pixels, then in a same row of the touch sensor units, the access points of the touch signal lines connected to the touch sensor units are in different colors of sub-pixels. For example, the access points of the touch signal lines in the first row of touch sensor units are sequentially in red sub-pixels, green sub-pixels, blue sub-pixels, . . . , the access points of the touch signal lines in the second row of the touch sensor units are sequentially in green sub-pixels, blue sub-pixels, red sub-pixels, . . . , and so on (see FIG. 2). In the display stage of the touch display screen, a touch signal line is used as a common electrode. Due to the different RC loadings of the touch signal lines in different positions and the different couplings of other signal lines, the pixel charging rate is different, and the sensitivities of different sub-pixels to the change of charging rate are different, thus causing the monochrome and mixed color display in the screen to have vertical stripes (Mura), and the period of the vertical stripes is consistent with the period of the access points of the touch signal lines connected to the touch sensor units.

Figure 2:
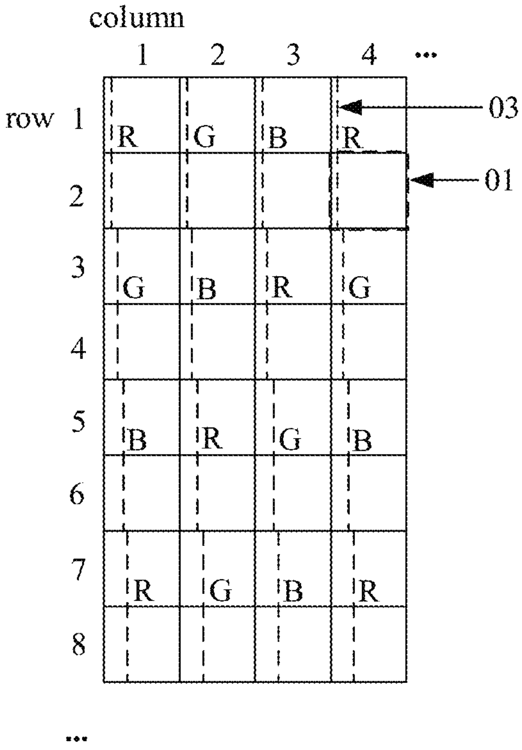
Related Art Fig. 2
FIG. 2 shows a schematic diagram of sub-pixels where access points of touch signal lines of touch sensor units are located in the related art.
Figure 3:
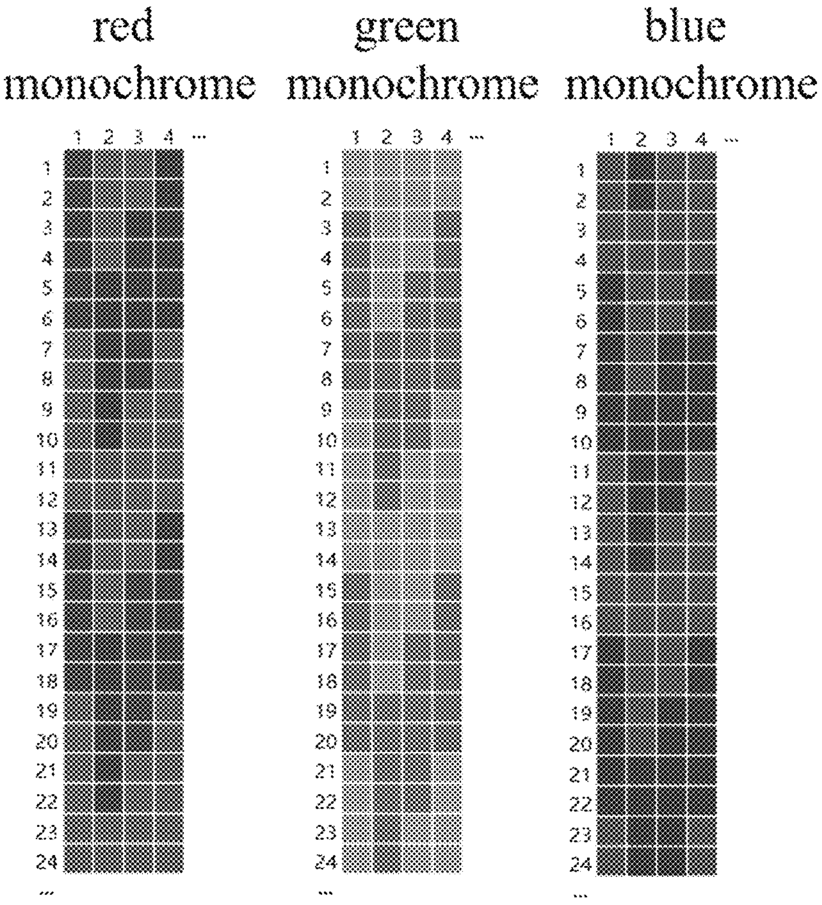
Related Art Fig. 3
FIG. 3 shows a schematic diagram of vertical stripes of touch sensor units caused by touch signal lines in the related art.
Figure 4:
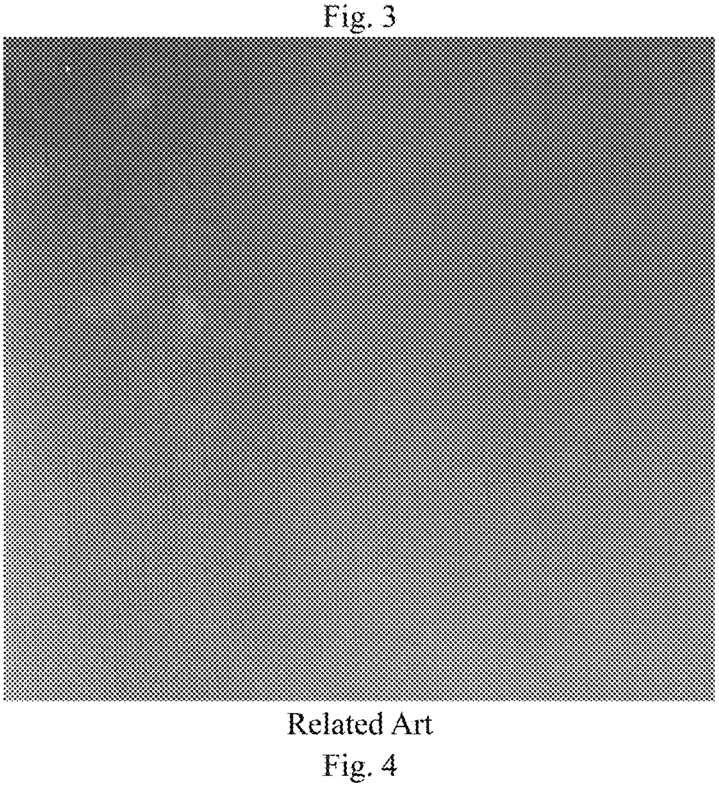
Related Art Fig. 4
FIG. 4 shows a picture of vertical stripes of a touch display screen in the related art.

Taking the division scheme of touch sensor units shown in FIG. 1 as an example, it will be explained that the period of the vertical stripes is consistent with the period of the access points of the touch signal lines connected to the touch sensor units. The display screen with the resolution of 3840×2160 is divided into 288 (H)×156 (V) touch sensor units, and there will be two touch signal lines in each sub-pixel, so the access points of the touch signal lines of every two rows of touch sensor units corresponds to a same color of sub-pixels. In this division scheme, each touch sensor unit corresponds to 40 sub-pixels in the first direction (H direction), since a pixel has 3 sub-pixels (red sub-pixel R, green sub-pixel G and blue sub-pixel B respectively), each touch sensor unit comprises a separate column of sub-pixels. For example, the sub-pixels corresponding to the extra separate column of sub-pixels in the same row of touch sensor units are red sub-pixels, green sub-pixels and blue sub-pixels in turn. One end of a touch signal line is connected to a control circuit through a chip-on-film (COF), and the other end is connected to a touch sensor unit through a via hole in the pixel. FIG. 2 shows a schematic diagram of sub-pixels where access points of touch signal lines of touch sensor units are located in the related art, wherein reference numeral 01 indicates the touch sensor unit, reference numeral 03 indicates the position of the access point of the touch signal line, and letters R, G and B beside the dotted line indicate that the access point is in a red sub-pixel, a green sub-pixel and a blue sub-pixel, respectively. As shown in FIG. 2, for the touch sensor units in the first row and the second row of the first column, the via holes of the touch signal lines connected to the touch sensor units are at red sub-pixels; for the touch sensor units in the third row and fourth row of the first column, the via holes of the touch signal lines connected to the touch sensor units are at green sub-pixels; for the touch sensor units in the fifth row and sixth row of the first column, the via holes of the touch signal lines connected to the touch sensor units are at blue sub-pixels. Since the touch sensor unit in the first row of the first column comprises a separate red sub-pixel, in the touch sensor unit in the first row of the second column, the first sub-pixel is a green sub-pixel, then for the touch sensor units in the first row and the second row of the second column, the via holes of the touch signal lines connected to the touch sensor units are at green sub-pixels. For the touch sensor units in the third row and the fourth row of the second column, the via holes of the touch signal lines connected to the touch sensor units are at blue sub-pixels. For the touch sensor units in the fifth row and the sixth row of the second column, the via holes of the touch signal lines connected to the touch sensor units are at red sub-pixels. By analogy, the touch signal line access point period with 6 rows and 4 columns of touch sensor units as the minimum repeating unit is formed. Because the RC loadings of the touch signal lines in different positions in the display screen are different, and the coupling pulls of the surrounding signal lines are also inconsistent, the pixel charging rates are slightly different, and the sensitivities of different sub-pixels to the charging rate difference are inconsistent (the order of sensitivity is G>R>B), which finally leads to the formation of periodic touch sensor unit vertical stripes (Mura) with the period of the touch signal line access point, and the light and dark periods of the vertical stripes are oblique translation. FIG. 3 shows a schematic diagram of vertical stripes of touch sensor units caused by touch signal lines in the related art. As shown in FIG. 3, in the red monochrome picture, the touch sensor units in row 1-6 of column 1 are displayed darker, and the touch sensor units in row 7-12 of column 1 are displayed brighter. The light and dark period of touch sensor units in column 2 is shifted down by 4 rows as a whole compared with the first column, and light and dark period of touch sensor units in column 3 is shifted down by 2 rows as a whole compared with the first column, and the light and dark period of touch sensor units in column 4 is the same as that in column 1; In the green monochrome picture, the light and dark period of the touch sensor units shifts down 2 rows as a whole compared with the red monochrome picture, and in the blue monochrome picture, the light and dark period of the touch sensor units shifts down 4 rows as a whole compared with the red monochrome picture. The period of the vertical stripes of the touch sensor units is completely consistent with the period of the access points of the touch signal lines connected to the touch sensor units. The Mura picture of the touch screen is shown in FIG. 4.

In order to improve the above-mentioned Mura, the present disclosure proposes a design scheme for optimizing the access points of touch signal lines, so that the access points of the touch signal lines connected to a same row of touch sensor units are in a same sub-pixel color environment. The RC loadings of the access points of the touch signal lines of each row of touch sensor units are close to each other, and the sub-pixel environments corresponding to the access points are the same, so that Mura will not be caused due to the different sensitivities of different sub-pixels to load changes, thereby improving the uniformity of display.

Figure 5:
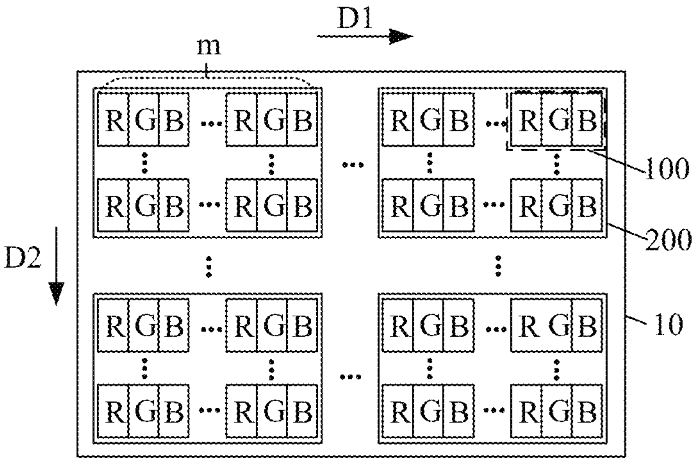
FIG. 5 shows a schematic diagram of an array substrate provided according to an embodiment of the present disclosure.
Figure 6:
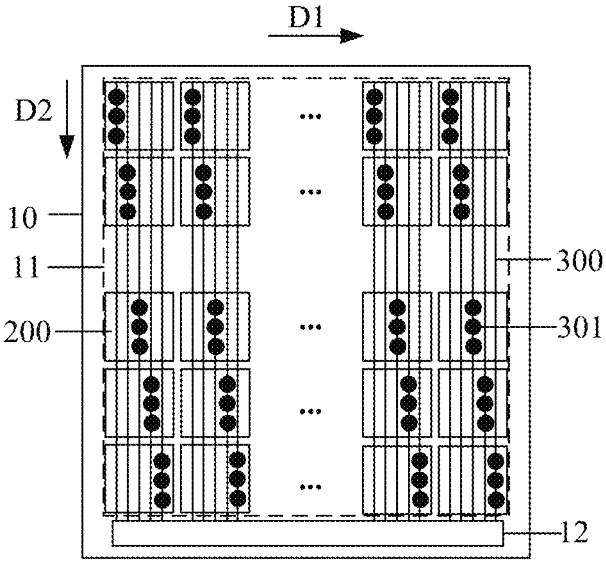
FIG. 6 shows a schematic diagram of an array substrate provided according to an embodiment of the present disclosure.

Embodiments of the present disclosure provide an array substrate, and FIG. 5 and FIG. 6 show schematic diagrams of the array substrate according to embodiments of the present disclosure. As shown in FIG. 5 and FIG. 6, the array substrate 10 includes: a plurality of pixels 100 arranged in an array, and each pixel includes N sub-pixels of different colors arranged along a first direction, and N≥3, and in a second direction, sub-pixels in a same column are sub-pixels with the same color. The first direction intersects the second direction, for example, the first direction is perpendicular to the second direction, the first direction corresponds to the row direction, and the second direction corresponds to the column direction. In the embodiments of the present disclosure, taking N=3 as an example, the three colors of sub-pixels are red sub-pixel (R), green sub-pixel (G) and blue sub-pixel (B) respectively; A plurality of touch sensor units 200 arranged in an array, each touch sensor unit 200 corresponding to m*N sub-pixels in the first direction D1 (i.e. the row direction), where m is a positive integer; A plurality of touch signal lines 300, each touch sensor unit 200 is connected with at least one touch signal line 300; In the first direction D1, each touch sensor unit 200 in the same row is connected to the same number of touch signal lines 300, each touch signal line 300 is connected with the corresponding touch sensor unit 200 through an access point 301, and the access points 301 of the touch signal lines 300 connected to the same row of touch sensor units 200 are in a same sub-pixel color environment.

It should be noted that, with reference to FIG. 5 and FIG. 6, the number of pixels 100 corresponding to each touch sensor unit 200 in the second direction D2 (that is, the column direction) is not specifically limited in the present disclosure, and the number of pixels corresponding to each touch sensor unit in the second direction can be reasonably allocated by a person skilled in the art according to the specific requirements of the resolution of the display screen, the number of touch chips, and the touch and display accuracy. For each column of touch sensor units, the number of pixels corresponding to each touch sensor unit in the second direction may be the same or different. In FIG. 6, the access point 301 is schematically represented by a black dot, and three access points are exemplarily shown on the touch signal line connected to each touch sensor unit, which does not mean that the number of pixels corresponding to each touch sensor unit in the second direction is limited.

It should be noted that, in the present disclosure, the description "the access points of the touch signal lines connected to a same row of touch sensor units are in a same sub-pixel color environment" at least includes the following four cases: the access points of the touch signal lines connected to the same row of touch sensor units are in the same color of sub-pixels; the access points of touch signal lines connected to the same row of touch sensor units are between same adjacent two colors of sub-pixels, for example, access points of touch signal lines connected to the same row of touch sensor units are all between R and G; each pixel comprises a first color sub-pixel, a second color sub-pixel and a third color sub-pixel, each touch sensor unit is divided into a first part and a second part adjacent in a second direction, the access point of the touch signal line connected to a touch sensor unit in row 3 c+1 is in the first color sub-pixel in the first part of the touch sensor unit in row 3 c+1, the access point of the touch signal line connected to the touch sensor unit in row 3 c+1 is in the second color sub-pixel in the second part of the touch sensor unit in row 3 c+1, the access point of the touch signal line connected to a touch sensor unit in row 3 c+2 is in the third color sub-pixel in the first part of the touch sensor unit in row 3 c+2, the access point of the touch signal line connected to the touch sensor unit in row 3 c+2 is in the first color sub-pixel in the second part of the touch sensor unit in row 3 c+2, the access point of the touch signal line connected to a touch sensor unit in row 3 c+3 is in the second color sub-pixel in the first part of the touch sensor unit in row 3 c+3, and the access point of the touch signal line connected to the touch sensor unit in row 3 c+3 is in the third color sub-pixel in the second part of the touch sensor unit in row 3 c+3, wherein c is 0 or a positive integer; each pixel comprises a first color sub-pixel, a second color sub-pixel and a third color sub-pixel, and the array substrate comprises at least one touch display area, in each touch display area, every three adjacent rows of touch sensor units form a touch sensor unit group, and the access points of touch signal lines connected to each touch sensor unit group are in a same color of sub-pixels, and along a second direction, the access points of touch signal lines connected to each touch sensor unit group sequentially rotate in the first color sub-pixel and second color sub-pixel.

Those skilled in the art can understand that in the present disclosure, a touch sensor unit is an area corresponding to a plurality of pixels, and the common electrodes of the pixels are interconnected in one touch sensor unit, but the common electrodes of the pixels of different touch sensor units are not interconnected. The touch signal line is connected with the common electrode of the pixel. In the display stage, both the touch signal line and the common electrode transmit the common electrode signal. In the touch stage, both the touch signal line and the pixel common electrode transmit touch signal.

In the design scheme of the access points of the touch signal lines proposed by the present disclosure, the access points of the touch signal lines connected to a same row of touch sensor units are in a same sub-pixel color environment, so that the RC loadings of the access points of the touch signal lines of each row of touch sensor units are close to each other, thus the Mura will not be caused due to the different sensitivities of different sub-pixels to loading changes, thereby improving the uniformity of display.

In the embodiments provided by the present disclosure, the access points where a plurality of touch signal lines of the array substrate are connected to touch sensor units involves at least two color environments, for example, at least two color of sub-pixels. In some related technologies, the access points of all touch signal lines connected to the touch sensor units are in the same color of sub-pixels (for example, blue sub-pixels), which is different from the situation in the present application.

Figure 7:
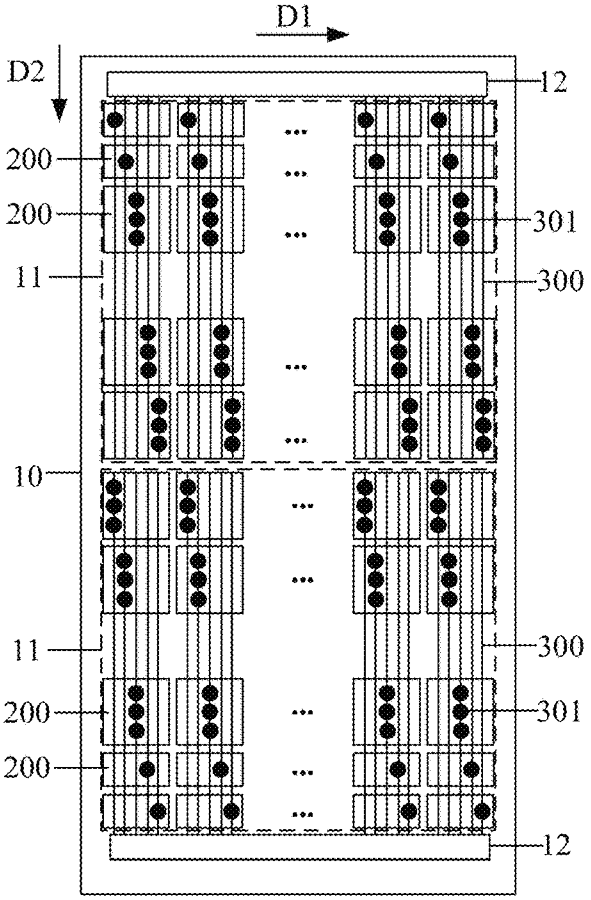
FIG. 7 shows a schematic diagram of an array substrate provided according to an embodiment of the present disclosure.

In an embodiment of the present disclosure, the array substrate may include at least one touch display area and at least one control chipset. For example, the array substrate 10 shown in FIG. 6 includes a touch display area 11 and a control chipset 12 for controlling the touch sensor units 200 in the touch display area 11. The array substrate 10 shown in FIG. 7 includes two touch display areas 11 and two control chipsets 12, each control chipset is used to control the touch sensor units in a corresponding touch display area, that is, the control chipset 12 in the upper part of FIG. 7 is used to control the touch sensor units 200 in the upper touch display area 11, and the control chipset 12 in the lower part of FIG. 7 is used to control the touch sensor units 200 in the lower touch display area 11. In the present disclosure, one touch chipset may include one or more touch chips, which may be designed by a person skilled in the art according to actual needs, and the present disclosure does not specifically limit this. In addition, in each display area, for each column of touch sensor units, the number of pixels corresponding to each touch sensor unit in the second direction may be the same or different, that is, a column of touch sensor units includes touch sensor units with different widths in the second direction. For example, as shown in FIG. 7, the touch sensor units in the area near the middle of the array substrate may correspond to more pixels in the second direction, and the touch sensor units near the upper and lower ends of the array substrate can correspond to fewer pixels in the second direction.

Figure 8A:
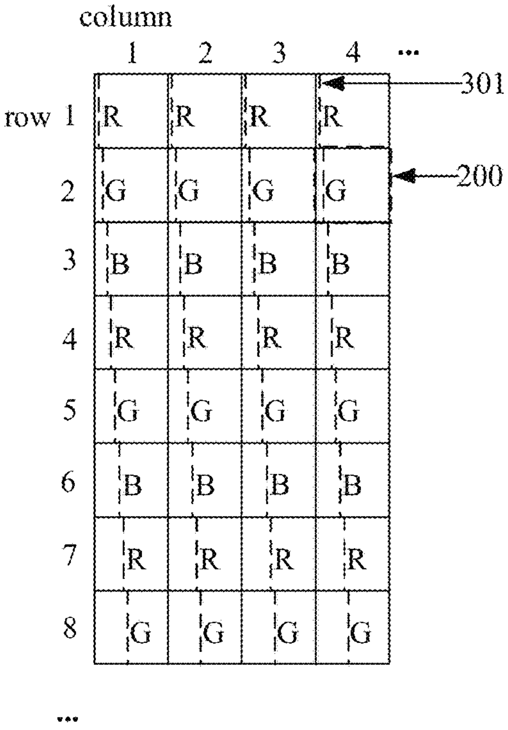
FIG. 8A shows an arrangement scheme of access points of touch signal lines of touch sensor units according to an embodiment of the present disclosure.
Figure 8B:
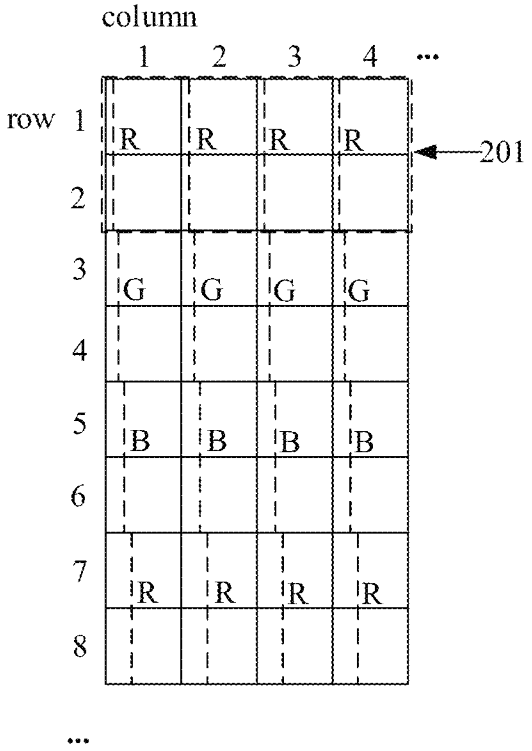
FIG. 8B shows another arrangement scheme of access points of touch signal lines of touch sensor units according to an embodiment of the present disclosure.
Figure 8C:
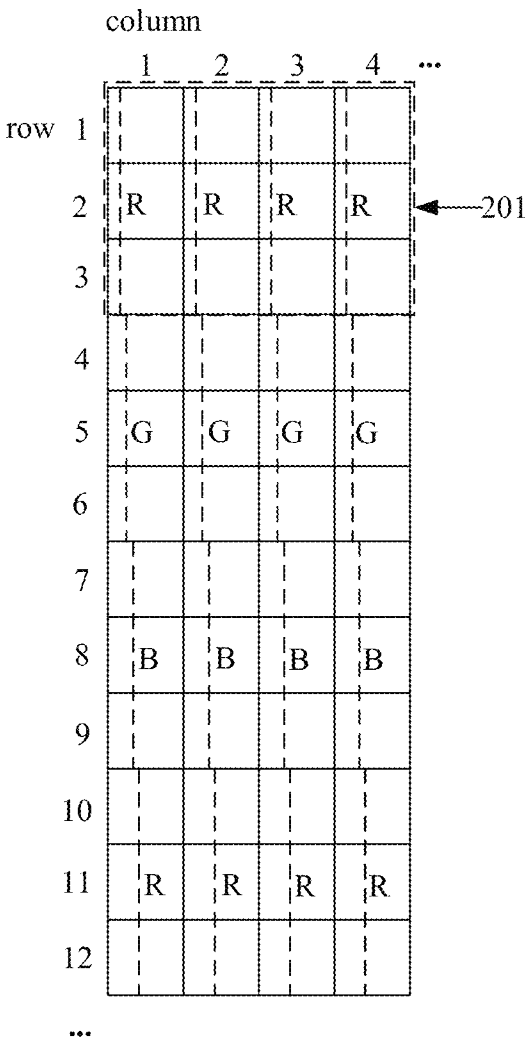
FIG. 8C shows another arrangement scheme of access points of touch signal lines of touch sensor units according to an embodiment of the present disclosure.

In some embodiments, in each touch display area, the access points of touch signal lines connected to the same row of touch sensor units are in the same color of sub-pixels, as shown in FIG. 8A, FIG. 8B and FIG. 8C.

Figure 8D:
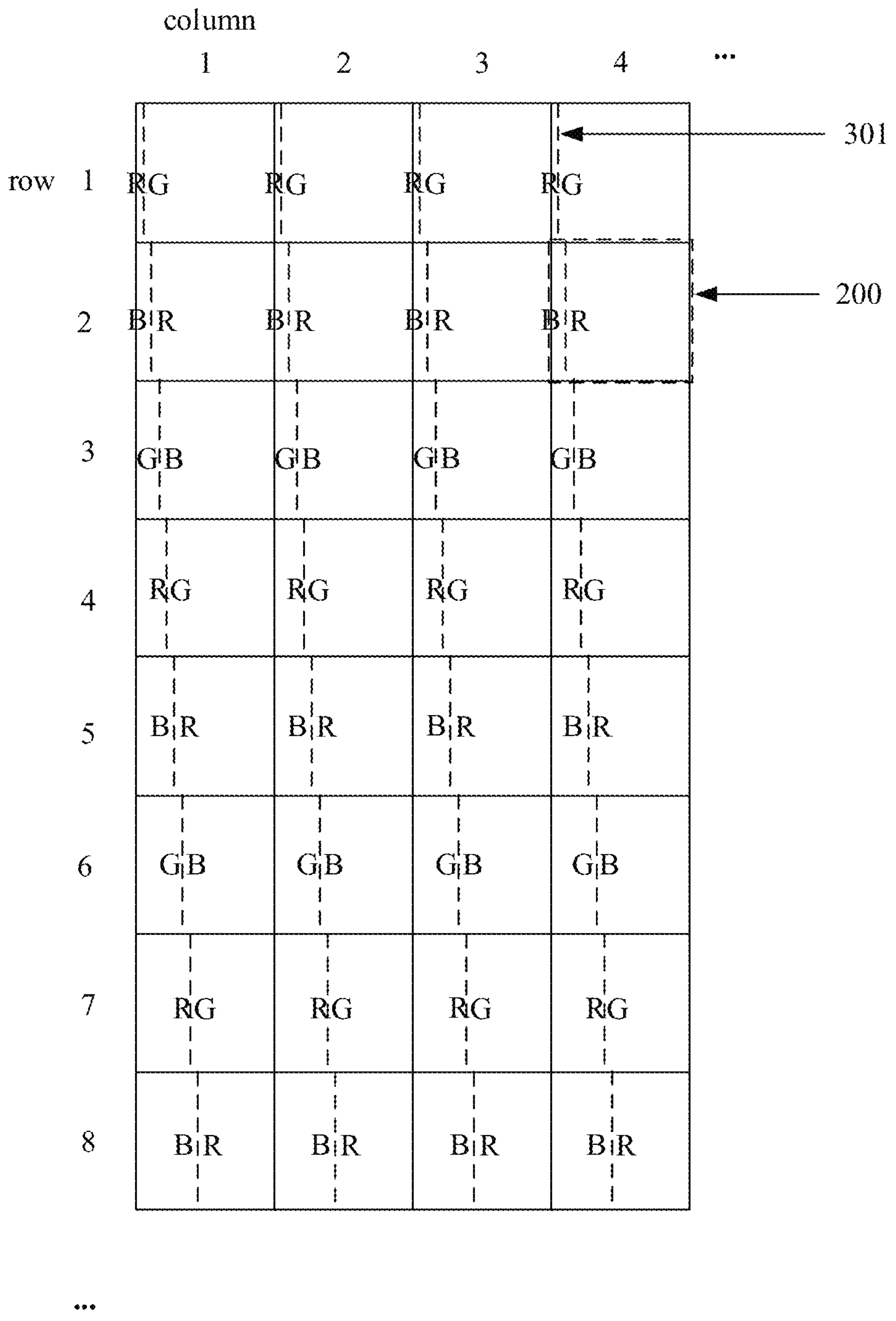
FIG. 8D shows another arrangement scheme of access points of touch signal lines of touch sensor units according to an embodiment of the present disclosure.
Figure 8E:
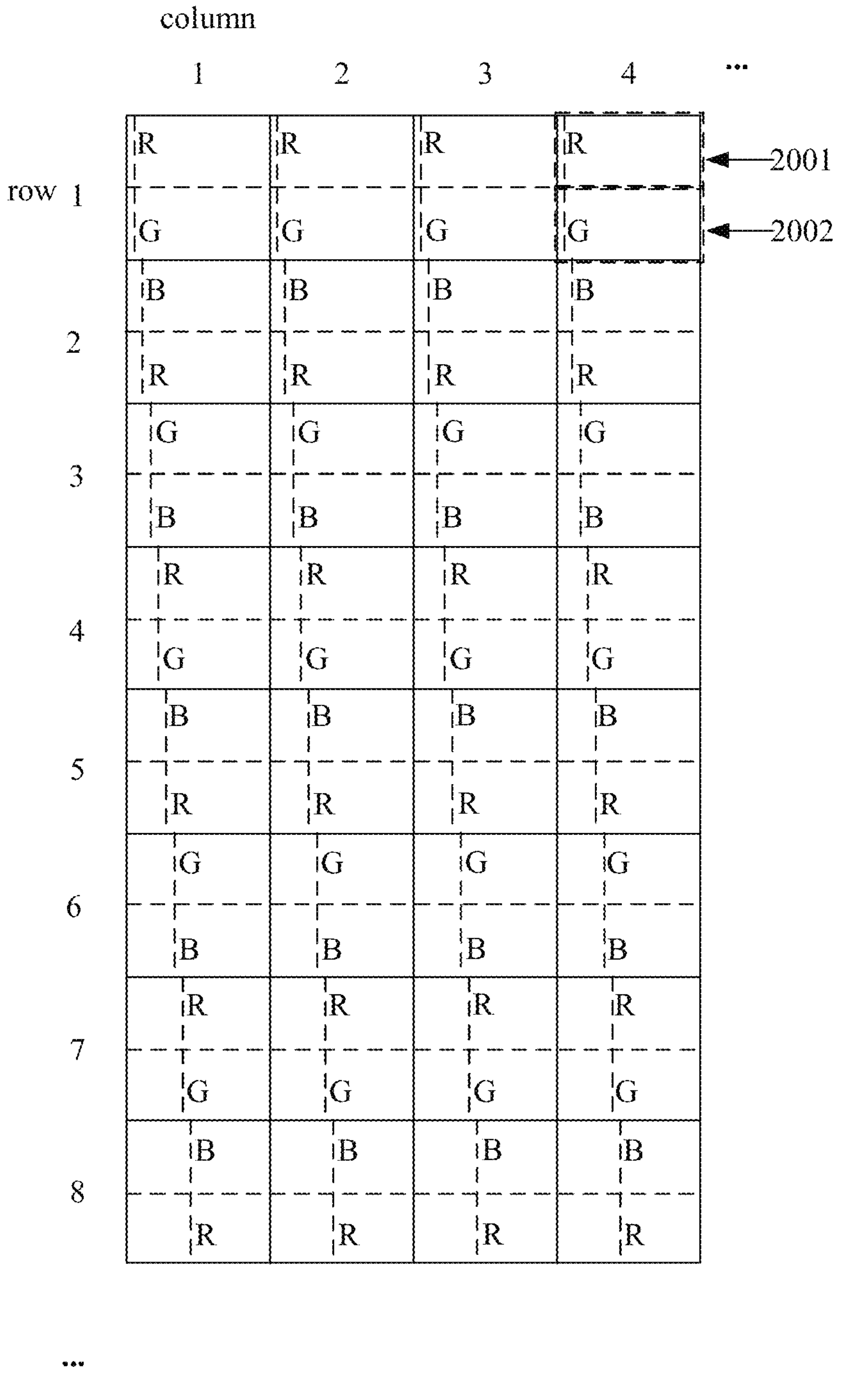
FIG. 8E shows arrangement scheme of access points of touch signal lines of touch sensor units according to an embodiment of the present disclosure.
Figure 8F:
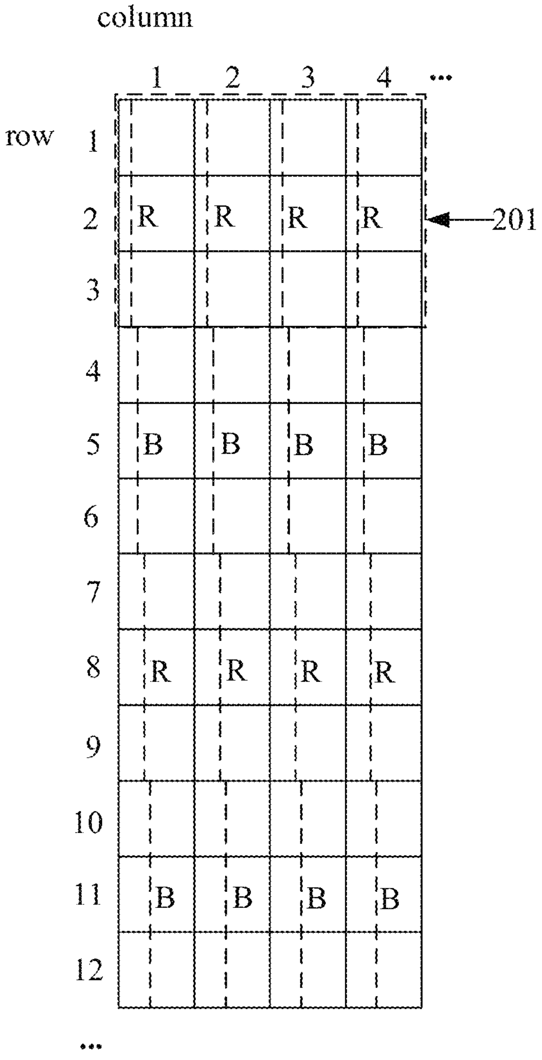
FIG. 8F shows arrangement scheme of access points of touch signal lines of touch sensor units according to an embodiment of the present disclosure.

Please note that in the arrangement scheme of access points of touch signal lines of touch sensor units shown in FIG. 8A, FIG. 8B, FIG. 8C and the following FIG. 8D, FIG. 8E and FIG. 8F, each rectangular block 200 represents a touch sensor unit, the gap between touch sensor units is omitted, and the numbers of rows and columns are marked on the upper and left sides of the picture respectively, the access points 301 of the touch signal line are simplified into a dashed line, and the letters R, G and B next to the dashed line indicate the colors of the sub-pixels where the access points are located.

In the embodiment shown in FIG. 8A, along the second direction (i.e., the column direction), the access points of the touch signal lines connected to each column of touch sensor units sequentially rotate among N colors of sub-pixels. For example, N=3, the three colors of sub-pixels are red sub-pixel (R), green sub-pixel (G) and blue sub-pixel (B) respectively, and the access points of the touch signal lines connected to each column of touch sensor units rotate in the red sub-pixel (R), green sub-pixel (G) and blue sub-pixel (B) in turn.

Taking a 50-inch touch display product with a resolution of 3200×2560 as an example, the division scheme of touch sensor units is: the number of touch sensor units is 160 (H)×108 (V), and each pixel includes three colors of sub-pixels. Each touch sensor unit corresponds to 60 sub-pixels in the H direction (corresponding to the first direction of the present disclosure), which are integer multiple of pixels. Since there will be one touch signal line in each sub-pixel, it can be designed that the access points of the touch signal lines corresponding to the touch sensor units in the first row are in red sub-pixels; the access points of the touch signal lines corresponding to the touch sensor units in the second row are in green sub-pixels; the access points of the touch signal lines corresponding to the touch sensor units in the third row are in blue sub-pixels, and so on.

In the embodiment shown in FIG. 8B, every two adjacent rows of touch sensor units form a touch sensor unit group 201, and the access points of the touch signal lines connected to each touch sensor unit group are in the same color of sub-pixels, and along a second direction (that is, the column direction), the access points of the touch signal lines connected to each touch sensor unit group sequentially rotate among N colors of sub-pixels. For example, N=3, the three color sub-pixels are red sub-pixel (R), green sub-pixel (G) and blue sub-pixel (B) respectively, and the access points of the touch signal lines connected to each column of touch sensor unit group rotate in the red sub-pixel (R), green sub-pixel (G) and blue sub-pixel (B) in turn.

Taking an 86-inch touch product with a resolution of 3840×2160 as an example, the division scheme of touch sensor units is: the number of touch sensor units is 256 (H)×180 (V) or 256 (H)×144 (V), and each pixel includes three colors of sub-pixels, so that each touch sensor unit corresponds to 45 sub-pixels in the H direction (corresponding to the first direction of the present disclosure), which are integer multiple of pixels. There are two touch signal lines in each sub-pixel, then the access points of the touch signal lines corresponding to the touch sensor units in row 1 and row 2 are in red sub-pixels; the access points of the touch signal lines corresponding to the touch sensor units in row 3 and row 4 are in green sub-pixels; the access points of the touch signal lines corresponding to the touch sensor units in row 5 and row 6 are in blue sub-pixels, and so on.

In the embodiment shown in FIG. 8C, every three adjacent rows of touch sensor units form a touch sensor unit group 201, and the access points of the touch signal lines connected to each touch sensor unit group 201 are in the same color of sub-pixels, and along the second direction (that is, the column direction), the access points of the touch signal lines connected to each touch sensor unit group 201 sequentially rotate in the sub-pixels of N colors. For example, N=3, the three color sub-pixels are red sub-pixel (R), green sub-pixel (G) and blue sub-pixel (B) respectively, and the access points of the touch signal lines connected to each column of touch sensor unit group rotate in the red sub-pixel (R), green sub-pixel (G) and blue sub-pixel (B) in turn.

Taking an 86-inch touch product with a resolution of 3840×2160 as an example, the division scheme of touch sensor units is: the number of touch sensor units is 256 (H)×180 (V), and each pixel includes three colors of sub-pixels, so that each touch sensor unit corresponds to 45 sub-pixels in the H direction (corresponding to the first direction of the present disclosure), which are integer multiple of pixels. There are three touch signal lines in each sub-pixel, and the access points of the touch signal lines can be designed as follows: the access points of the touch signal lines corresponding to the touch sensor units in rows 1~3 are in red sub-pixels; the access points of the touch signal lines corresponding to the touch sensor units in rows 4~6 are in green sub-pixels; the access points of the touch signal lines corresponding to the touch sensor units in rows 7~9 are in blue sub-pixels, and so on.

In some embodiments, in each touch display area, the access points of touch signal lines connected to the same row of touch sensor units are between the same adjacent two colors of sub-pixels. For example, access points of the touch signal lines connected to the touch sensor units in row 3a+1 are between a first color sub-pixel and a second color sub-pixel, access points of the touch signal lines connected to the touch sensor units in row 3a+2 are between a third color sub-pixel and a first color sub-pixel, and access points of the touch signal lines connected to the touch sensor units in row 3a+3 are between a second color sub-pixel and a third color sub-pixel, wherein a is 0 or a positive integer, as shown in FIG. 8D.

In an implementation, the access points of the touch signal lines connected to the touch sensor units in row 3a+1 are between the first color sub-pixel and the second color sub-pixel comprises: for each touch sensor unit in row 3a+1, in a pixel in row 2b+1, the access point of the touch signal line is in the first color sub-pixel, and in a pixel in row 2b+2, the access point of the touch signal line is in the second color sub-pixel, wherein b is 0 or a positive integer; the access points of the touch signal lines connected to the touch sensor units in row 3a+2 are between the third color sub-pixel and the first color sub-pixel comprises: for each touch sensor unit in row 3a+2, in a pixel in row 2b+1, the access point of the touch signal line is in the third color sub-pixel, and in a pixel in row 2b+2, the access point of the touch signal line is in the first color sub-pixel, wherein b is 0 or a positive integer; and the access points of the touch signal lines connected to the touch sensor units in row 3a+3 are between the second color sub-pixel and the third color sub-pixel comprises: for each touch sensor unit in row 3a+3, in a pixel in row 2b+1, the access point of the touch signal line is in the second color sub-pixel, and in a pixel in row 2b+2, the access point of the touch signal line is in the third color sub-pixel, wherein b is 0 or a positive integer.

In another implementation, the access points of the touch signal lines connected to the touch sensor units in row 3a+1 are between the first color sub-pixel and the second color sub-pixel comprises: for each touch sensor unit in row 3a+1, in each row of pixels, the access point of the touch signal line spans across the first color sub-pixel and the second color sub-pixel; the access points of the touch signal lines connected to the touch sensor units in row 3a+2 are between the third color sub-pixel and the first color sub-pixel comprises: for each touch sensor unit in row 3a+2, in each row of pixels, the access point of the touch signal line spans across the third color sub-pixel and the first color sub-pixel; and the access points of the touch signal lines connected to the touch sensor units in row 3a+3 are between the second color sub-pixel and the third color sub-pixel comprises: for each touch sensor unit in row 3a+3, in each row of pixels, the access point of the touch signal line spans across the second color sub-pixel and the third color sub-pixel.

In the embodiment shown in FIG. 8D, each pixel includes a red sub-pixel, a green sub-pixel and a blue sub-pixel, the access points of the touch signal lines connected to the first row of touch sensor units are between the red sub-pixel and the green sub-pixel, the access points of the touch signal lines connected to the second row of touch sensor units are between the blue sub-pixel and the red sub-pixel, and so on.

Taking a 42-inch touch product with a resolution of 3200×2160 as an example, the division scheme of touch sensor units is: the number of touch sensor units is 80 (H)×60 (V), and each pixel includes three colors of sub-pixels. Each touch sensor unit corresponds to 120 sub-pixels in the H direction (corresponding to the first direction of the present disclosure), which are integer multiple of pixels, and corresponds to 60 pixels in the V direction (corresponding to the second direction of the present disclosure). Considering that every two sub-pixels will have a touch signal line, the access points of the touch signal lines can be designed as follows: the access points of the touch signal lines corresponding to the touch sensor units in row 1 are between the red sub-pixel and the green sub-pixel; the access points of the touch signal lines corresponding to the touch sensor units in row 2 are between the blue sub-pixel and the red sub-pixel; the access points of the touch signal lines corresponding to the touch sensor units in row 3 are between the green sub-pixel and the blue sub-pixel, and so on. There are two specific implementation modes: the first mode is that in the touch sensor unit in the first row and the first column, the access point of the touch signal line of the first row of pixels is in the red sub-pixel, the access point of the touch signal line of the second row of pixels is in the green sub-pixel, and the access point of the touch signal line of the third row of pixels is in the red sub-pixel, and so on; the second mode is that in the touch sensor unit in the first row and the first column, the access point of the touch signal line of the first row of pixels spans across the red sub-pixel and the green sub-pixel, and the access point of the touch signal line of the second row of pixels also spans across the red sub-pixel and the green sub-pixel. The characteristic of the second mode is that the load influence of the access point of the touch signal line on the same touch sensor unit is equally divided on the sub-pixels of two colors.

Figure 9A:
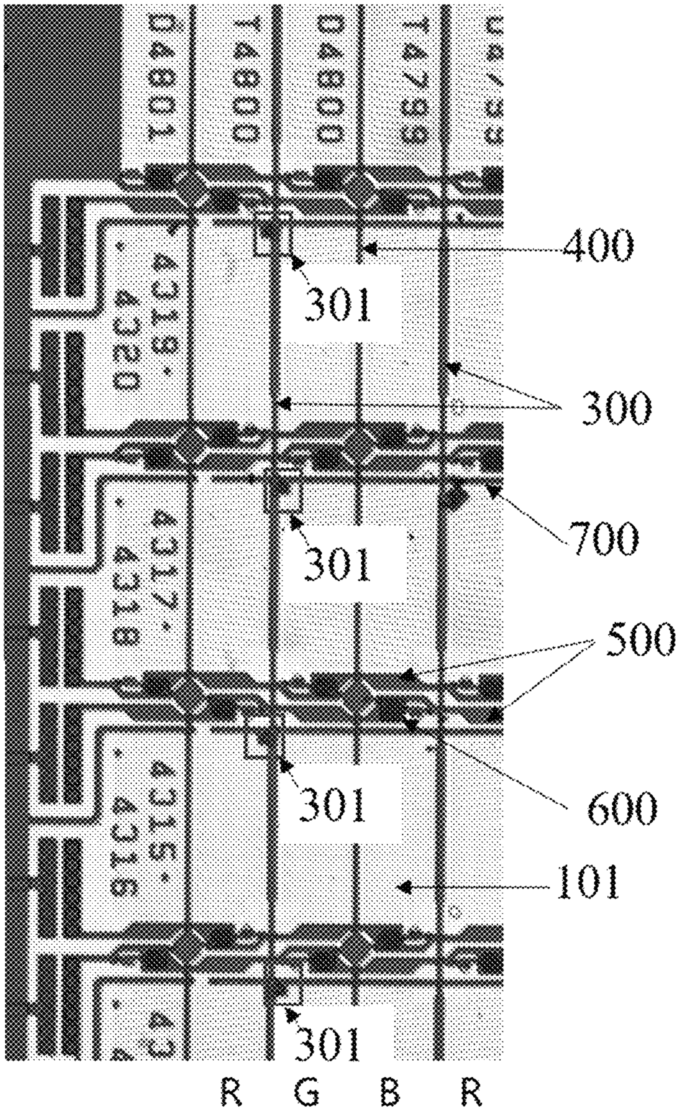
FIG. 9A shows a micrograph of an array substrate provided according to an embodiment of the present disclosure.
Figure 9B:
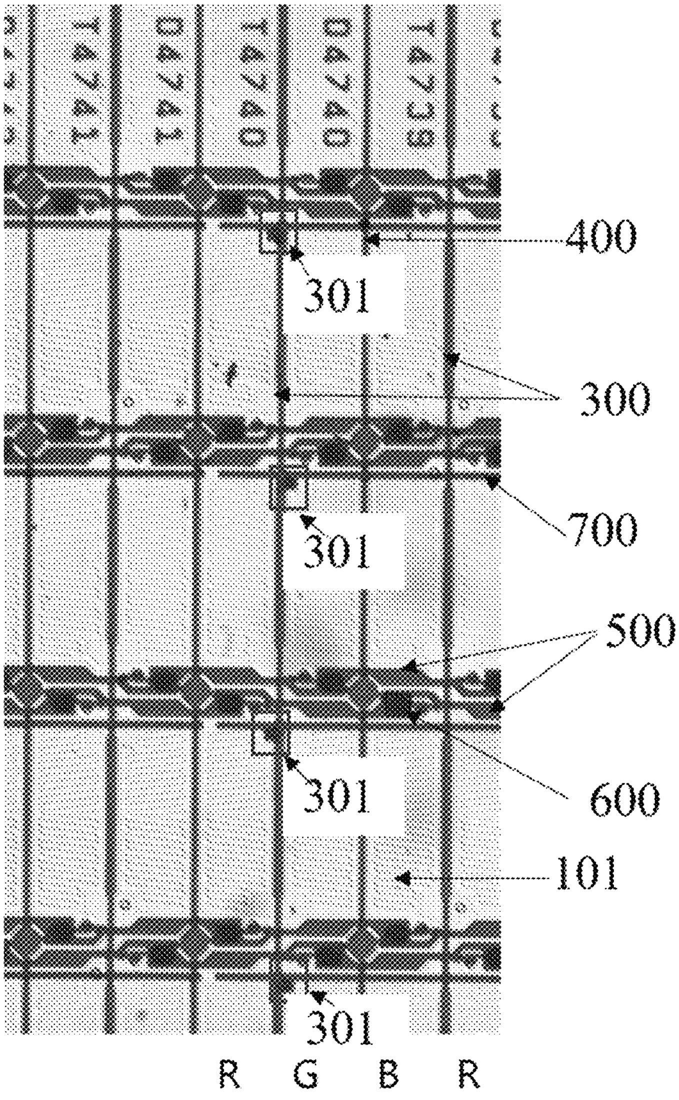
FIG. 9B shows a micrograph of another array substrate provided according to an embodiment of the present disclosure.
Figure 9C:
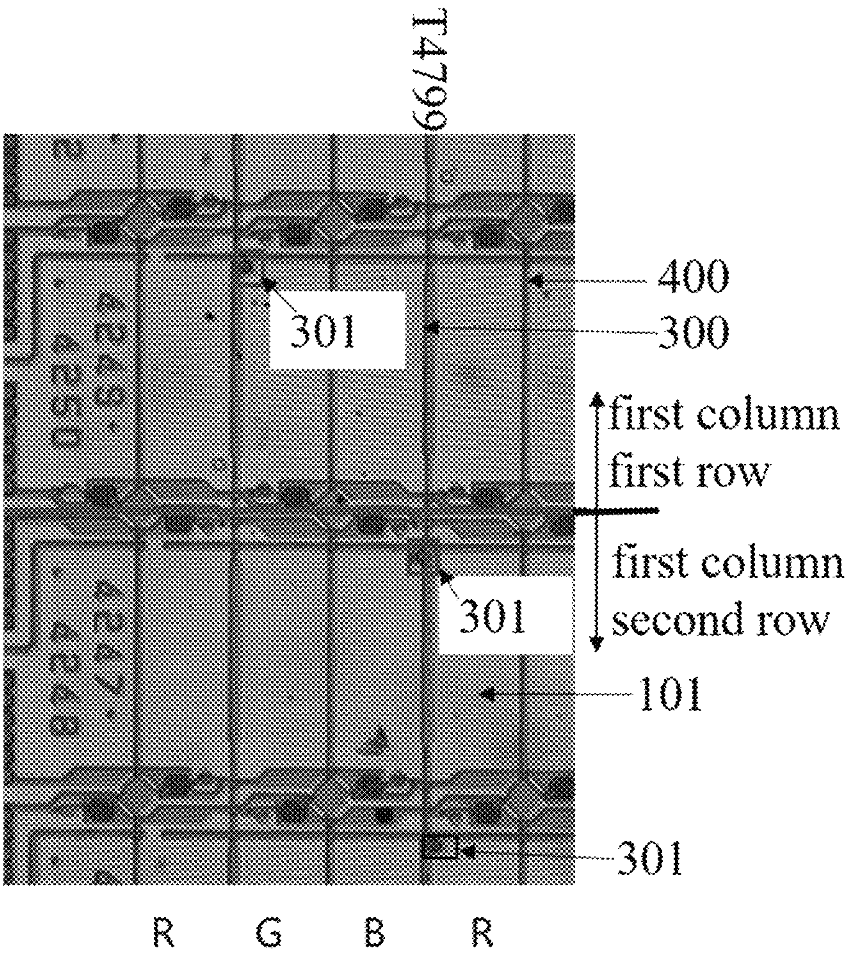
FIG. 9C shows a micrograph of another array substrate provided according to an embodiment of the present disclosure.
Figure 9D:
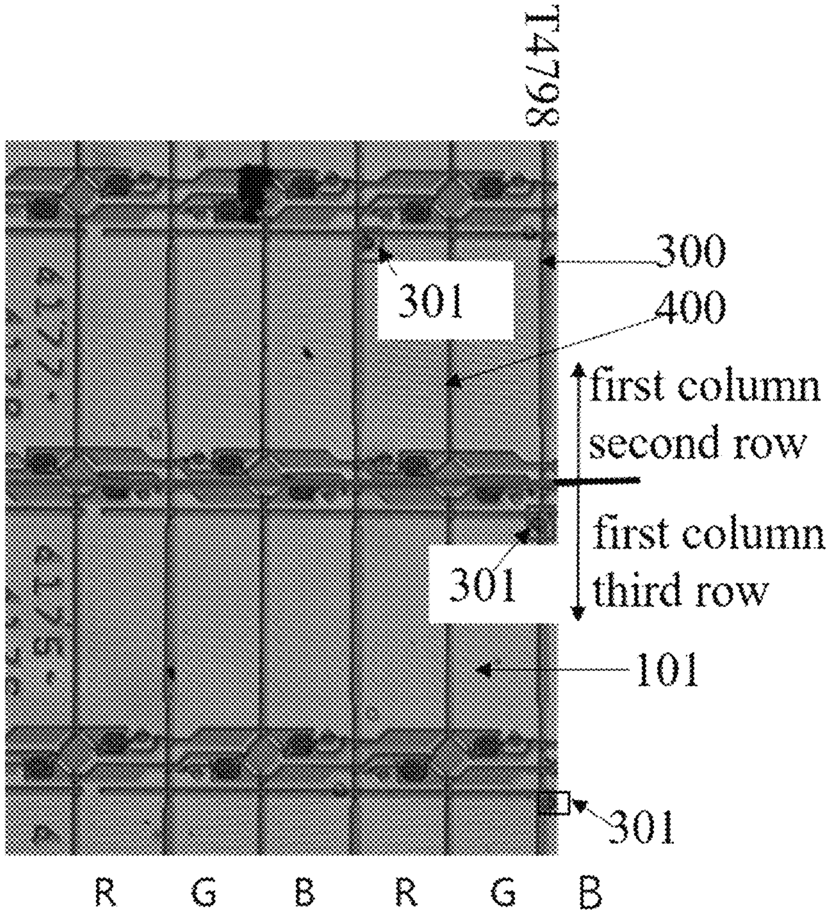
FIG. 9D shows a micrograph of another array substrate provided according to an embodiment of the present disclosure.

For the first mode mentioned above, FIG. 9A, FIG. 9B, FIG. 9C, and FIG. 9D show micrographs of the array substrate. As shown in FIG. 9A, in the H direction of the panel, touch signal lines 300 (numbered with the initial letter T) and data lines 400 (numbered with the initial letter D) are alternately arranged in turn. The numbers of the touch signal lines 300 and data lines 400 are respectively 4800→1 from left to right, and in the V direction, the numbers of the gate lines 500 are 1→4320 from bottom to top. In this embodiment, the access points of the touch signal lines are via holes, the position of the access points are shown by blocks and indicated by reference numeral 301. Reference numeral 101 indicates a sub-pixel, and letters R, G and B below the picture indicate the colors of the sub-pixels. Reference numeral 600 indicates a TFT, and the specific structure of the TFT is not clearly shown at this magnification, and its position is only shown by a dotted line block, those skilled in the art can understand the specific structure of the TFT. Reference numeral 700 indicates a touch sensor unit electrode, which is connected with the touch signal line 300, each touch sensor unit corresponds to one touch sensor unit electrode, and adjacent touch sensor unit electrodes 700 are disconnected to control the touch sensor units separately. The touch sensor unit electrodes may include common electrodes connected by metal wires or be independently composed of common electrodes. FIG. 9A shows a part of the touch sensor unit in the first row and the first column. In the first row of pixels, the access point 301 of the touch signal line numbered T4800 is in the red sub-pixel, and in the second row of pixels, the access point of the touch signal line numbered T4800 is in the green sub-pixel. FIG. 9B shows a part of the touch sensor unit in the first row and the second column. In the first row of pixels, the access point 301 of the touch signal line numbered T4740 is in the red sub-pixel, and in the second row of pixels, the access point of the touch signal line numbered T4740 is in the green sub-pixel. FIG. 9C shows a part of the touch sensor units in the first and second rows and in the first column, and the gate lines numbered 4177~4248 corresponds to the touch sensor unit in the second row and in the first column. In this touch sensor unit, in the first row of pixels, the access point 301 of the touch signal line numbered T4799 is in the blue sub-pixel, and in the second row of pixels, the access point 301 of the touch signal line numbered T4799 is in the red sub-pixel. FIG. 9D shows a part of the touch sensor units in the second and third rows and in the first column, and the gate lines numbered 4105-4176 corresponds to the touch sensor unit in the third row and in the first column. In this touch sensor unit, in the first row of pixels, the access point 301 of the touch signal line numbered T4798 is in the green sub-pixel, and in the second row of pixels, the access point 301 of the touch signal line numbered T4798 is in the blue sub-pixel.

Figure 9E:
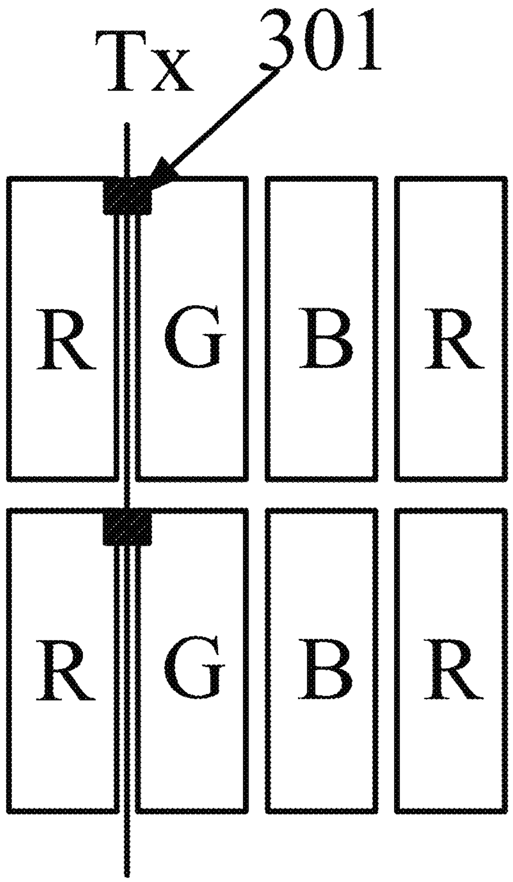
FIG. 9E shows a schematic diagram of an arrangement scheme of access points according to an embodiment of the present disclosure.

For the second mode mentioned above, FIG. 9E shows a schematic diagram that the access points of the touch signal lines span across two adjacent color of sub-pixels. As shown in FIG. 9E, in the first row of pixels, the access point of the touch signal line spans across the red sub-pixel and the green sub-pixel, and in the second row of pixels, the access point of the touch signal line also spans across the red sub-pixel and the green sub-pixel. In the disclosure, "span across" means that the access point of the touch signal line is in two adjacent colors of sub-pixels at the same time, so that the load influence of the access point of the touch signal line on the same touch sensor unit is equally divided on the sub-pixels of two colors.

In some embodiments, each pixel comprises a first color sub-pixel, a second color sub-pixel and a third color sub-pixel, each touch sensor unit is divided into a first part and a second part adjacent in a second direction, the access point of the touch signal line connected to a touch sensor unit in row 3 c+1 is in the first color sub-pixel in the first part of the touch sensor unit in row 3 c+1, the access point of the touch signal line connected to the touch sensor unit in row 3 c+1 is in the second color sub-pixel in the second part of the touch sensor unit in row 3 c+1, the access point of the touch signal line connected to a touch sensor unit in row 3 c+2 is in the third color sub-pixel in the first part of the touch sensor unit in row 3 c+2, the access point of the touch signal line connected to the touch sensor unit in row 3 c+2 is in the first color sub-pixel in the second part of the touch sensor unit in row 3 c+2, the access point of the touch signal line connected to a touch sensor unit in row 3 c+3 is in the second color sub-pixel in the first part of the touch sensor unit in row 3 c+3, and the access point of the touch signal line connected to the touch sensor unit in row 3 c+3 is in the third color sub-pixel in the second part of the touch sensor unit in row 3 c+3, wherein c is 0 or a positive integer, as shown in FIG. 8E.

In the embodiment shown in FIG. 8E, the first color sub-pixel is red sub-pixel R, the second color sub-pixel is green sub-pixel G, and the third color sub-pixel is blue sub-pixel B. Each touch sensor unit is divided into a first part 2001 and a second part 2002 adjacent in the second direction, the access point of touch signal line connected to a touch sensor unit in the first row is in the red sub-pixel in the first part 2001 of the touch sensor unit in the first row, the access point of touch signal line connected to the touch sensor unit in the first row is in the green sub-pixel in the second part 2002 of the touch sensor unit in the first row, the access point of the touch signal line connected to a touch sensor unit in the second row is in the blue sub-pixel in the first part 2001 of the touch sensor unit in the second row, the access point of the touch signal line connected to the touch sensor unit in the second row is in the red sub-pixel in the second part 2002 of the second touch sensor unit in the second row, the access point of the touch signal line connected to a touch sensor unit in the third row is in the green sub-pixel in the first part 2001 of the touch sensor unit in the third row, and the access point of the touch signal line connected to the touch sensor unit in the third row is in the blue sub-pixel in the second part 2002 of the touch sensor unit in the third row.

Taking a 42-inch touch sensor product with a resolution of 3200×2160 as an example, the division scheme of touch sensor units is: the number of touch sensor units is 80 (H)×60 (V), and each pixel includes three colors sub-pixels. Each touch sensor unit corresponds to 120 sub-pixels in the H direction, which are integer multiple of pixels. Considering that every two sub-pixels will have a touch signal line, the access points of the touch signal lines can be designed as follows: the access point of the touch signal line corresponding to the upper half of the touch sensor unit in the first row is in the red sub-pixel; the access point of the touch signal line corresponding to the lower half of the touch sensor unit in the first row is in the green sub-pixel; the access point of the touch signal line corresponding to the upper half of the touch sensor unit in the second row is in the blue sub-pixel, and so on. The characteristic of this implementation is that the load influence of the access points of the touch signal lines corresponding to the upper and lower parts of each touch sensor unit is distributed on two colors of sub-pixels.

In some embodiments, each pixel comprises a first color sub-pixel, a second color sub-pixel and a third color sub-pixel, and the array substrate comprises at least one touch display area, in each touch display area, every three adjacent rows of touch sensor units form a touch sensor unit group, the access points of touch signal lines connected to each touch sensor unit group are in a same color of sub-pixels, and along a second direction, the access points of touch signal lines connected to each touch sensor unit group sequentially rotate in the first color sub-pixel and the third color sub-pixel, as shown in FIG. 8F.

In the embodiment shown in FIG. 8F, the first color sub-pixel is red sub-pixel R, the second color sub-pixel is green sub-pixel G, and the third color sub-pixel is blue sub-pixel B. In each touch display area, every three adjacent rows of touch sensor units form a touch sensor unit group 201, the access points of touch signal lines connected to each touch sensor unit group are in a same color of sub-pixels, along a second direction, the access points of touch signal lines connected to each touch sensor unit group sequentially rotate in the red sub-pixel and the blue sub-pixel, and no access point of the touch signal line is arranged in the green sub-pixels.

Taking an 86-inch touch product with a resolution of 3840×2160 as an example, the division scheme of touch sensor units is: the number of touch sensor units is 256 (H)×180 (V), and each pixel includes three colors of sub-pixels. Each touch sensor unit corresponds to 45 sub-pixels in the H direction of the touch sensor unit (corresponding to the first direction of the present disclosure), which are integer multiple of pixels. There are three touch signal lines in each sub-pixel, and that access points of the touch signal lines can be designed as follows: the access points of the touch signal lines corresponding to the touch sensor units in rows 1~3 are in red sub-pixels; the access points of the touch signal lines corresponding to the touch sensor units in rows 4~6 are in blue sub-pixels; the access points of the touch signal lines corresponding to the touch sensor units in rows 7~9 are in red sub-pixels, and so on. Since there are three touch signal lines in each sub-pixel, it has a great influence on the aperture ratio. Considering that the green sub-pixel has the greatest influence on the display brightness, the touch signal lines are arranged in the red sub-pixel and the blue sub-pixel, and the green sub-pixel is not provided with the touch signal lines, so as to ensure the aperture ratio of the green sub-pixel.

Figure 10:
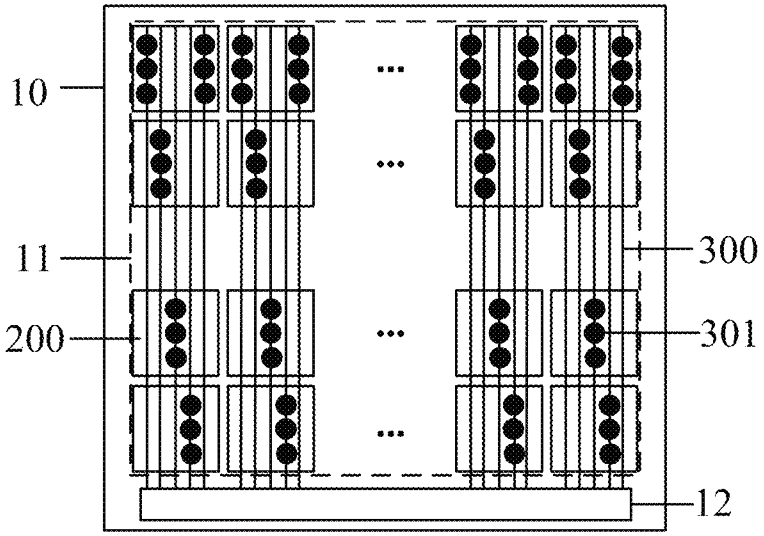
FIG. 10 shows an arrangement scheme of access points of touch signal lines of touch sensor units according to an embodiment of the present disclosure.

In some embodiments, in each touch display area, each of at least one row of touch sensor units arranged at an end far from the control chipset is connected with two touch signal lines respectively, and the access points of the touch signal lines connected to a same row of touch sensor units are in a same sub-pixel color environment, as shown in FIG. 10.

In FIG. 10, each of the row of touch sensor units farthest from the control chipset is connected with two touch signal lines respectively, and each of the rows of touch sensor units close to the control chipset is connected with one touch signal line respectively, and the access points of the touch signal lines connected to a same row of touch sensor units are in a same sub-pixel color environment. Here, "the access points of the touch signal lines connected to a same row of touch sensor units are in a same sub-pixel color environment" comprises the above-mentioned various situations in which the color environment is the same, which are not repeated here.

In some embodiments, in each touch display area, each touch signal line extends the whole touch display area in the second direction, so that the resistance and capacitance loads of each touch signal line are as close as possible, which is more conducive to display uniformity.

In some embodiments, a plurality of dummy signal lines may also be arranged, and each dummy signal line extends in the same layer and in the same direction as the plurality of touch signal lines, so as to avoid the large difference between the structure of pixels without touch signal lines and the structure of pixels with touch signal lines, and further make the loads of each pixel as close as possible, which is more conducive to the uniformity of display.

In some embodiments, each sub-pixel unit includes a common electrode, and at the access point of each touch signal line, the touch signal line is connected with the common electrode of the corresponding sub-pixel unit through a via hole. Disposing a via hole is one way to connect the touch signal line to the common electrode of the sub-pixel, and the present disclosure does not exclude other access methods, such as direct connection.

In some embodiments, the access points of multiple touch signal lines are in the same color of sub-pixels in the same row of pixels, further improving the uniformity of display.

Figure 11A:
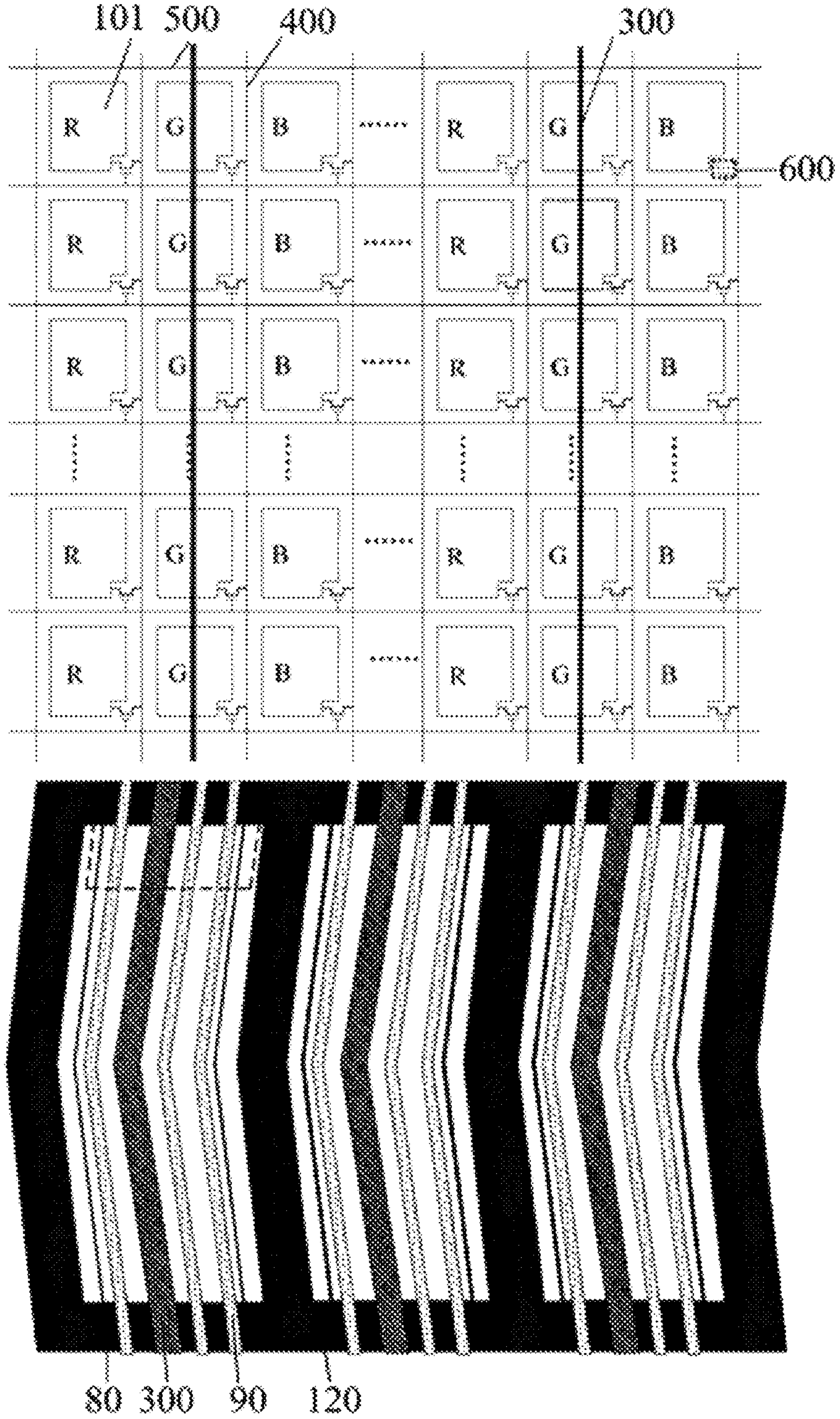
FIG. 11A shows an arrangement of touch signal lines provided according to an embodiment of the present disclosure.
Figure 11B:
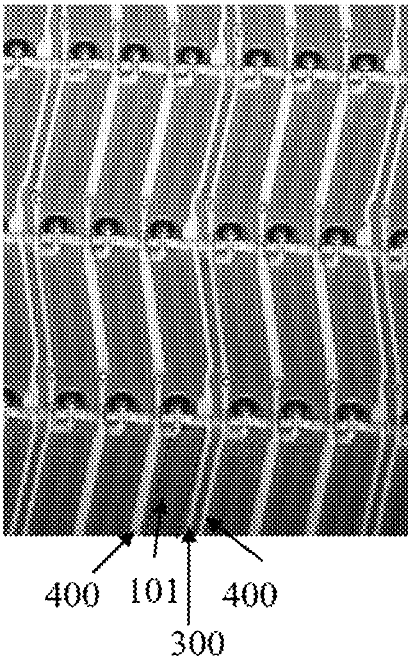
FIG. 11B shows another arrangement of touch signal lines provided according to an embodiment of the present disclosure.
Figure 11C:
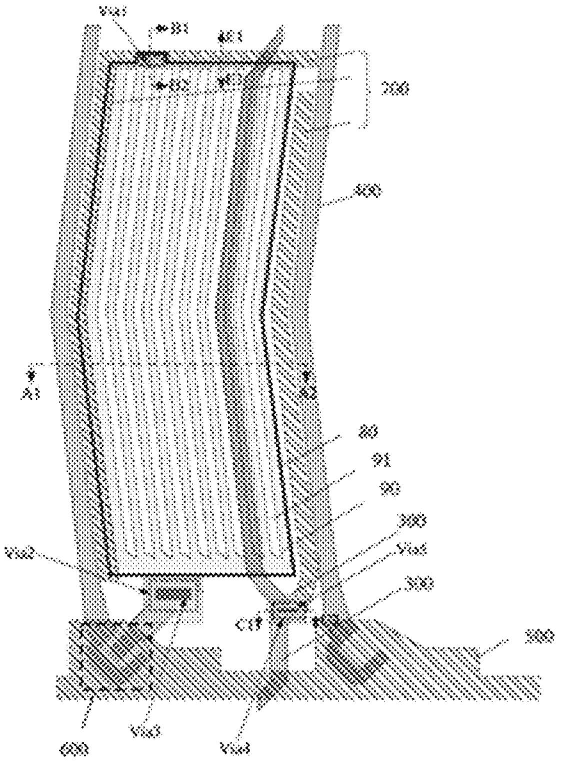
FIG. 11C shows another arrangement of touch signal lines provided according to an embodiment of the present disclosure.
Figure 11D:
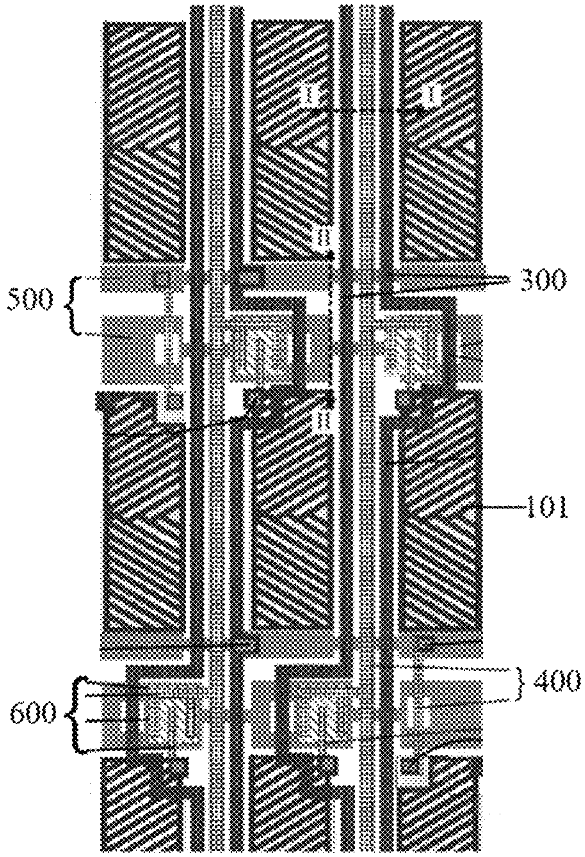
FIG. 11D shows another arrangement of touch signal lines provided according to an embodiment of the present disclosure.
Figure 11E:
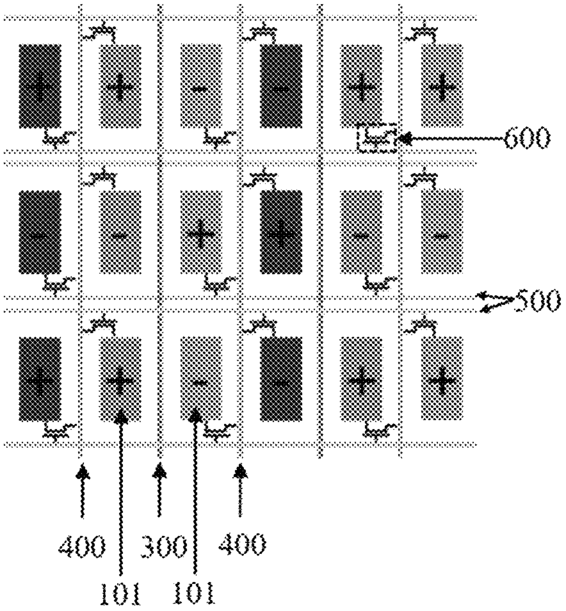
FIG. 11E shows another arrangement of touch signal lines provided according to an embodiment of the present disclosure.

In some embodiments, as shown in FIGS. 9A, 9B, 9C and 9D, the orthographic projection of the touch signal lines on the array substrate is within the orthographic projection of the black matrix on the array substrate. It should be noted that the black matrix is not shown in the figures. In some embodiments, the black matrix may be on the array substrate, and the black matrix may also be on the color film substrate opposite to the array substrate. FIGS. 11A-11E respectively show different arrangements of touch signal lines, in which reference numeral 101 indicates a sub-pixel, reference numeral 300 indicates a touch signal line, reference numeral 400 indicates a data line, reference numeral 500 indicates a gate line, reference numeral 600 indicates a TFT, reference numeral 700 indicates a touch sensor unit electrode, reference numeral 80 indicates a pixel electrode, reference numeral 90 indicates a common electrode, reference numeral 91 indicates an opening of the common electrode, and reference numeral 120 indicates a black matrix. As shown in FIG. 11A, the touch signal line 300 may be arranged in the opening area. In some embodiments, the touch signal line is in the area surrounded by the gate line and the data line, and the orthogonal projection of the touch signal line on the array substrate does not overlap with the orthogonal projection of the black matrix on the array substrate. The touch signal line and the data line may be made of the same layer of metal or different layers of metal. As shown in FIG. 11B, the touch signal line 300 and the data line 400 are made of the same layer of metal, and the touch signal line 300 and the data line 400 are arranged side by side. In the embodiment shown in FIG. 11B, there is only one column of sub-pixels 101 between two adjacent data lines 400, and the touch signal line 300 is between the two adjacent data lines 400, so the touch data line 300 belongs to the column of sub-pixels 101. As shown in FIG. 11C, the touch signal line 300 may also pass through the opening area and be connected with peripheral auxiliary metal lines. As shown in FIG. 11D, in a large-size display device, touch signal lines 300 may be provided on both sides of the data line 400. As shown in FIG. 11E, a touch signal line 300 may be arranged between every two sub-pixels 101.

Different display modes, various positional relationships between touch signal lines and data lines, various positional relationships between touch signal lines and opening areas, and whether the touch signal lines are connected with surrounding auxiliary lines are all included in the protection scope of the invention.

According to another aspect of the present disclosure, there is also provided a touch display device including the array substrate as described in the above embodiments. The touch display device has the above advantages of the array substrate, which will not be described here.

In the drawings, the thickness of areas and layers may be exaggerated for clarity. In the drawings, the same reference numerals denote the same or similar structures, and therefore their detailed description is omitted. The described features, structures, or characteristics may be combined in any suitable manner in one or more embodiments. In the description, numerous specific details are provided to give a thorough understanding of the embodiments of the present disclosure. However, those skilled in the art will realize that the technical solution of the present disclosure can be practiced without one or more of the specific details, or other methods, components, materials, etc. can be adopted. In other instance, well-known structures, material or operations are not shown or described in detail to avoid obscuring that main technical concept of the present disclosure.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present disclosure.

Spatial relative terms such as "row", "column", "up", "down", "left" and "right" can be used in the disclosure to describe the relationship between one element or feature and another element or feature as illustrated in the figures. It will be understood that these spatially relative terms are intended to cover different orientations of devices in use or operation other than those depicted in the figures. For example, if the device in the figure is turned over, elements described as "under other elements or features" or "below other elements or features" will be oriented as "above other elements or features". Thus, the exemplary term "under" can cover both orientations of "above" and "under". Devices can be oriented in other ways (rotated by 90 degrees or in other orientations) and the spatial relative descriptors used herein should be interpreted accordingly. In addition, it will also be understood that when a layer is referred to as "between two layers", it may be the only layer between the two layers, or there may be one or more intermediate layers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. In the description of this specification, descriptions referring to the terms "an embodiment", "another embodiment" and the like mean that a specific feature, structure, material or characteristic described in connection with this embodiment is included in at least one embodiment of the disclosure. In this specification, the schematic expressions of the above terms are not necessarily aimed at the same embodiment or example. Moreover, the specific feature, structure, material or characteristic described may be combined in any one or more embodiments or examples in a suitable manner. In addition, those skilled in the art can combine different embodiments or examples and features of different embodiments or examples described in this specification without contradicting each other.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As will be understood by those skilled in the art, although the steps of the method in the present disclosure are described in a specific order in the drawings, this does not require or imply that the steps must be performed in that specific order unless the context clearly indicates otherwise. Additionally or alternatively, multiple steps may be combined into one step for execution, and/or one step may be decomposed into multiple steps for execution. In addition, other steps may be inserted between steps. The inserted step may represent an improvement of a method such as that described herein, or may be independent of the method. Furthermore, a given step may not be completely completed before the next step begins.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. An array substrate comprising:

a plurality of pixels arranged in an array, wherein each pixel comprises N sub-pixels of different colors arranged along a first direction, and N≥3;

a plurality of touch sensor units arranged in an array, wherein each touch sensor unit corresponds to m*N sub-pixels in the first direction, and m is a positive integer;

a plurality of touch signal lines, wherein each touch sensor unit is connected with at least one touch signal line;

wherein along the first direction, each touch sensor unit in a same row is connected with a same number of touch signal lines, each touch signal line is connected with a corresponding touch sensor unit through an access point, and the access points of the touch signal lines connected to a same row of touch sensor units are in a same sub-pixel color environment, wherein the access points of the plurality of touch signal lines are in at least two colors of sub-pixels, wherein the array substrate comprises at least one touch display area, and in each touch display area, access points of touch signal lines connected to the same row of touch sensor units are between same adjacent two colors of sub-pixels.

2. The array substrate according to claim 1, wherein each pixel comprises a first color sub-pixel, a second color sub-pixel and a third color sub-pixel, access points of the touch signal lines connected to the touch sensor units in row 3a+1 are between a first color sub-pixel and a second color sub-pixel, access points of the touch signal lines connected to the touch sensor units in row 3a+2 are between a third color sub-pixel and a first color sub-pixel, and access points of the touch signal lines connected to the touch sensor units in row 3a+3 are between a second color sub-pixel and a third color sub-pixel, wherein a is 0 or a positive integer.

3. The array substrate according to claim 2, wherein the access points of the touch signal lines connected to the touch sensor units in row 3a+1 are between the first color sub-pixel and the second color sub-pixel comprises: for each touch sensor unit in row 3a+1, in a pixel in row 2b+1, the access point of the touch signal line is in the first color sub-pixel, and in a pixel in row 2b+2, the access point of the touch signal line is in the second color sub-pixel, wherein b is 0 or a positive integer;

the access points of the touch signal lines connected to the touch sensor units in row 3a+2 are between the third color sub-pixel and the first color sub-pixel comprises: for each touch sensor unit in row 3a+2, in a pixel in row 2b+1, the access point of the touch signal line is in the third color sub-pixel, and in a pixel in row 2b+2, the access point of the touch signal line is in the first color sub-pixel, wherein b is 0 or a positive integer; and the access points of the touch signal lines connected to the touch sensor units in row 3a+3 are between the second color sub-pixel and the third color sub-pixel comprises: for each touch sensor unit in row 3a+3, in a pixel in row 2b+1, the access point of the touch signal line is in the second color sub-pixel, and in a pixel in row 2b+2, the access point of the touch signal line is in the third color sub-pixel, wherein b is 0 or a positive integer.

4. The array substrate according to claim 2, wherein, the access points of the touch signal lines connected to the touch sensor units in row 3a+1 are between the first color sub-pixel and the second color sub-pixel comprises: for each touch sensor unit in row 3a+1, in each row of pixels, the access point of the touch signal line spans across the first color sub-pixel and the second color sub-pixel;

the access points of the touch signal lines connected to the touch sensor units in row 3a+2 are between the third color sub-pixel and the first color sub-pixel comprises: for each touch sensor unit in row 3a+2, in each row of pixels, the access point of the touch signal line spans across the third color sub-pixel and the first color sub-pixel; and the access points of the touch signal lines connected to the touch sensor units in row 3a+3 are between the second color sub-pixel and the third color sub-pixel comprises: for each touch sensor unit in row 3a+3, in each row of pixels, the access point of the touch signal line spans across the second color sub-pixel and the third color sub-pixel.

5. The array substrate according to claim 2, wherein the first color sub-pixel comprises a red sub-pixel, the second color sub-pixel comprises a green sub-pixel and the third color sub-pixel comprises a blue sub-pixel.

6. The array substrate according to claim 1, wherein the array substrate comprises at least one control chipset, and each control chipset is configured to control touch sensor units in a corresponding touch display area.

7. The array substrate according to claim 6, wherein in each touch display area, each of at least one row of touch sensor units arranged at an end far from the control chipset is connected to two touch signal lines respectively, and each of at least one row of touch sensor units arranged at an end near the control chipset is connected to one touch signal line respectively, and the access points of the touch signal lines connected to a same row of touch sensor units are in a same sub-pixel color environment.

8. The array substrate according to claim 6, wherein in each touch display area, each touch signal line extends the entire touch display area in the second direction.

9. The array substrate according to claim 1, further comprising a plurality of dummy signal lines, each dummy signal line extending in a same layer and a same direction as the plurality of touch signal lines.

10. The array substrate according to claim 1, wherein each sub-pixel unit comprises a common electrode, and at the access point of each touch signal line, the touch signal line is connected with the common electrode of the corresponding sub-pixel unit through a via hole.

11. A touch display device comprising the array substrate according to claim 1.

* * * * *